(12) United States Patent
Cha et al.

(10) Patent No.: US 8,039,174 B2
(45) Date of Patent: Oct. 18, 2011

(54) FLEXIBLE FUEL CELL

(75) Inventors: Hye Yeon Cha, Gyunggi-Do (KR); Tae Hoon Kim, Gyunggi-Do (KR); Chang Sup Ryu, Gyunggi-Do (KR); Sam Jin Her, Gyunggi-Do (KR); Sung Han Kim, Gyunggi-Do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 1336 days.

(21) Appl. No.: 11/641,716

(22) Filed: Dec. 20, 2006

(65) Prior Publication Data

US 2007/0138133 A1   Jun. 21, 2007

(30) Foreign Application Priority Data

Dec. 21, 2005 (KR) .................. 10-2005-0126771

(51) Int. Cl.
*H01M 8/02* (2006.01)
*H01M 4/88* (2006.01)

(52) U.S. Cl. ....................... 429/535; 429/530

(58) Field of Classification Search .............. None
See application file for complete search history.

(56) References Cited

U.S. PATENT DOCUMENTS

| 2003/0180594 A1 | 9/2003 | Choi et al. |
| 2004/0197613 A1 | 10/2004 | Curlier et al. |
| 2004/0229105 A1 | 11/2004 | Miura |
| 2004/0247992 A1 | 12/2004 | Kabumoto et al. |
| 2005/0074651 A1* | 4/2005 | Kidai et al. ............. 429/30 |

FOREIGN PATENT DOCUMENTS

| JP | 4-252237 | 9/1992 |
| JP | 2001-236971 | 8/2001 |
| JP | 2003-036867 | 2/2003 |
| JP | 2003-068325 | 3/2003 |
| JP | 2003-151585 | 5/2003 |
| JP | 2003-282131 | 10/2003 |
| JP | 2004-273150 | 9/2004 |
| JP | 2004-342489 | 12/2004 |
| JP | 2005-108661 | 4/2005 |
| JP | 2005-222809 | 8/2005 |
| JP | 2005-268176 | 9/2005 |
| JP | 2005-310556 | 11/2005 |
| KR | 2004-0104843 | 12/2004 |
| WO | WO 00/45457 | 8/2000 |
| WO | WO-2004/095603 | 11/2004 |

OTHER PUBLICATIONS

P. Svasek et al., "SU-8-Based Fluidic Devices," Proceedings of the GMe Forum, 2005, pp. 217-222.*
Japanese Office Action received May 28, 2010 in corresponding Japanese Patent Application No. 2006-344683.
G.Q. Lu et al., "Development and Characterization of a Silicon-based Micro Direct Methanol Fuel Cell", Electrochimica Acta 49 (2004), pp. 821-828.

(Continued)

*Primary Examiner* — Jonathan Crepeau

(57) ABSTRACT

Through holes for flow paths of the fuel cell are formed in a thermoplastic polymer film by a process selected from a group consisting of laser drilling, etching and lithography, an inner side surface of the thermoplastic polymer film is coated with a metal layer, and the through holes are filled with a fuel diffusion material and a catalyst to provide an anode. The procedure is repeated to provide a cathode. Then, the anode and the cathode are placed to oppose each other. A cation conducting polymer membrane is disposed, between the anode and the cathode, and the anode, the cation conducting polymer membrane and the cathode are hot-pressed.

7 Claims, 10 Drawing Sheets

OTHER PUBLICATIONS

Woo Young Sim et al., "Fabrication of Micro Power Source (MPS) Using a Micro Direct Methanol Fuel Cell (µDMFC) for the Medical Application", IEEE (2001), pp. 341-344.

Japanese Office Action mailed Apr. 5, 2011 issued in Japanese Application No. 2006-344683.

German Office Action, mailed Jul. 3, 2008, in corresponding German Patent Application No. 10 2006 059 934.9.

\* cited by examiner

|  Si |  Nafion-115membrane |
| --- | --- |
|  SiO₂ |  Cr/Au | a. Etch flow paths in surface by DRIE b. Etch through holes for supplying fuel c. Deposit metal layer for current collecting d. Insert and sandwich MEA between Si wafers Si wafer    Cr/Cu/Au    MEA (a)

(b)

▧ SU-8  ▨ Glass  ▩ Film mask a. Spin coating SU-8 on glass b. Exposing to UV c. Forming patterns d. Lift-off process e. Hot-pressing (a)

(b)

FLEXIBLE FUEL CELL

CLAIM OF PRIORITY

This application claims the benefit of Korean Patent Application No. 2005-126771 filed on Dec. 21, 2005, in the Korean Intellectual Property Office, the disclosure of which is incorporated herein by reference.

BACKGROUND OF THE INVENTION

1. Field of the Invention

The present invention relates to a micro fuel cell system applicable to an electronic device, and more particularly, to a micro fuel cell configured by processing a flexible polymer material.

2. Description of the Related Art

There have been active developments on small-sized fuel cells used for notebook computers, wireless pagers, digital camcorders, cameras, hearing aids and portable power sources, and micro fuel cells used as power sources for the next-generation MicroElectroMechanical Systems (MEMS). These fuel cells involve mechanically processing conventional materials (silicon, Polydimethylsiloxane (PDMS), etc.) by forming micro holes and channels using a semiconductor integrated circuit process and the conventional MEMS technology.

In order to manufacture a conventional micro fuel cell, researches have been conducted on application of a silicon substrate to the micro fuel cell. Based on the research results, the fuel cell shown in FIG. 1 has been experimentally manufactured. The system is characterized by connecting several pieces of unit cells of planar electrolyte membranes and electrodes in series and disposing the unit cells between thin disc-shaped Si substrates each having a diameter of about 10 cm. In the Si substrates, micro gas channels were made using micromachining techniques. However, the micro fuel cell with such silicon substrates is manufactured by the semiconductor integrated circuit process, resulting in high manufacturing costs. Moreover, it is not easily applicable as a power supply source for a mobile electronic device such as a mobile phone and a Personal Digital Assistant (PDA) due to fragility of silicon. In addition, the interfacial bonding between the silicon and Nafion®, commercially available from Dupont, USA, is not good, thus negatively affecting the efficiency of the fuel cell.

In the case of a silicon fuel cell applicable to a mobile electronic device adopting the integrated circuit process and using silicon material, micro channels for supplying fuel are formed in the silicon by etching, and metallic material is deposited on the surface of the electrode by sputtering, etc. to function as a current collecting layer of electrons. This silicon fuel cell, however, has weak interfacial bonding with Nafion®, which makes up the membrane of the fuel cell system, and thus may have cracks formed in Nafion® due to the differences in Coefficients of Thermal Expansion (CTE) or hygroscopicity, resulting in a fatal defect of the system. In addition, due to the fragility of silicon, the fuel cell is not applicable to a mobile electronic device as a power source.

In this regard, "*Proceedings of the 14th IEEE International Conference on Micro Electro Mechanical Systems*", pages 21-25 by W. Y. Sim, G. Y. Kim and S. S. Yang (refer to FIG. 2), and "*Electrochimica Acta*" 49(2004), pages 821-828, by G. Q. Lu, C. Y. Wang, T. J. Yen and X. Zhang (refer to FIG. 3) disclose technologies aimed to optimize an electrode structure to enhance the performance of the electrodes and precisely design a stack structure to minimize the internal volume and increase the output density per volume using the integrated circuit process. The integrated circuit technology facilitates miniaturization using the extensive technologies accumulated to date. The silicon fuel cell system using silicon as the material of the cell may be manufactured in the form of a thin film. The flow channels are formed in the silicon substrate using an etching process of semiconductor, with Membrane Electrode Assembly (MEA) formed over the micro channels via deposition, etc. As indicated in the non-patent documents 1 and 2, researchers have suggested different methods of forming tens of micro-units of holes or channels in the silicon substrate.

Such silicon material is advantageous for micro-sized machining, but it incurs high manufacturing costs since it requires the semiconductor integrated circuit process. In addition, formation of channels in the fuel cell with silicon material requires a lithography process or mechanical and chemical etching processes, resulting in a complicated manufacturing process.

Korea Patent No. 0494307 discloses a conventional technology in which a photosensitive polymer material is coated on a glass substrate by spin coating and exposed to ultraviolet rays to form a pattern, and eliminated from the glass substrate via a lift-off process, thereby obtaining a photosensitive polymer structure (refer to FIG. 4). In this fuel cell, the polymer material is used to form the structure, thereby reducing contact resistance to improve performance. In addition, the fuel cell is manufactured in a simple process with its thickness and design easily modifiable, which in turn facilitates mass-production.

However, the photosensitive polymer material has a drawback that it breaks up easily with application of strength exceeding a certain degree although it is improved in mechanical strength after undergoing exposure to light and baking. In addition, the photosensitive polymer material remaining in the final product without being stripped after lithography is too expensive, thus not applicable in practice.

SUMMARY OF THE INVENTION

The present invention has been made to solve the foregoing problems of the prior art and therefore an object of certain embodiments of the present invention is to provide a method of manufacturing a fuel cell structure by processing flexible polymer material, and more particularly, a fuel cell structure manufactured in a simpler process and low-cost compared to the fuel cell using a silicon fuel cell or MEMS technology.

According to an aspect of the invention for realizing the object, there is provided a method of manufacturing a micro fuel cell comprising steps of:

(i) forming through holes for flow paths of the fuel cell in a thermoplastic polymer film by a process selected from a group consisting of laser drilling, etching and lithography, coating a metal layer on an inner side surface of the thermoplastic polymer film, and filling the through holes with a fuel diffusion material and a catalyst to provide an anode;

(ii) repeating the procedure of step (i) to provide a cathode; and (iii) placing the anode and the cathode to oppose each other, disposing a cation conducting polymer film between the anode and the cathode, and hot-pressing the anode, the cation conducting polymer membrane and the cathode.

According to another aspect of the invention for realizing the object, there is provided a method of manufacturing a micro fuel cell comprising steps of:

(i) preparing two layers of thermoplastic polymer films in a stacked structure, wherein each of the layers has through holes formed for flow paths of the fuel cell by a process selected from a group consisting of laser drilling, etching and lithography, and an inner side surface of the stacked layers is coated with a metal layer and wherein the through holes of one layer has a diameter different from those in the other layer, and filling the through holes having a great diameter with a fuel diffusion material to form a fuel diffusion layer and filling the through holes having a smaller diameter with a catalyst to form a catalyst layer, thereby providing an anode;

(ii) repeating the procedure if step (i) to provide a cathode; and (iii) placing the anode and the cathode to oppose each other, disposing a cation conducting polymer membrane between the anode and the cathode, and hot-pressing the anode, the cation conducting polymer membrane and the cathode.

According to still another aspect of the invention for realizing the object, there is provided a method of manufacturing a micro fuel cell comprising steps of:

(i) providing a fuel supply layer by forming through holes in a thermoplastic polymer film by a process selected from a group consisting of laser drilling, lithography and etching, and forming a fuel diffusion layer with carbon paper or carbon cloth on a lower part of the fuel supply layer, and providing a catalyst layer on a lower part of the fuel diffusion layer to provide an anode;

(ii) repeating the procedure of step (i) to provide a cathode; and (iii) placing the anode and the cathode to oppose each other, disposing a cation conducting polymer membrane between the anode and the cathode, and hot-pressing the anode, the cation conducting polymer membrane and the cathode together.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

A flexible fuel cell according to the present invention designates a power supply device applicable to particular products such as a wearable mobile phone, a wearable computer and a Bio-MEMS. In addition, unless mentioned otherwise, an 'outer side surface' designates a surface of a film approximate to an outer surface of the fuel cell, and an 'inner side surface' designates a surface of a film approximate to a central portion of the entire structure of the fuel cell, i e., approximate to a cation conducting polymer membrane.

In order to manufacture a flexible fuel cell according to a first embodiment of the present invention, through holes for flow paths of the fuel cell are formed in a thermoplastic polymer film using a PCB process, and a metal layer is coated on the an inner side surface of the thermoplastic polymer film. Then a fuel diffusion layer and a catalyst layer are formed in the through holes to provide an anode. The procedure of the above step is repeated to provide a cathode. Then a cation conducting polymer membrane such as a proton exchange membrane is disposed between the anode and the cathode. The anode, the cation conducting polymer membrane and the cathode are hot-pressed together to finally obtain a micro fuel cell.

The thermoplastic polymer film may adopt one that is a material for a printed circuit board, and more specifically, one selected from a group consisting of polyimide or Liquid Crystal Polymer (LCP) and a Teflon film.

Figure 6:
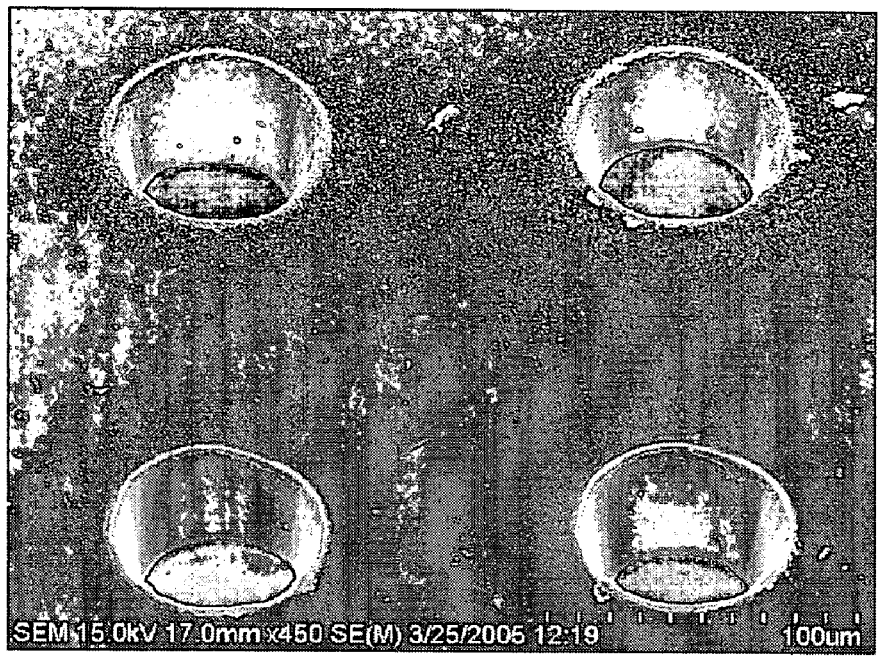
FIG. 6 is a view illustrating a basic structure of the fuel cell according to the present invention with a polymer film having through holes formed therein.
Figure 6:
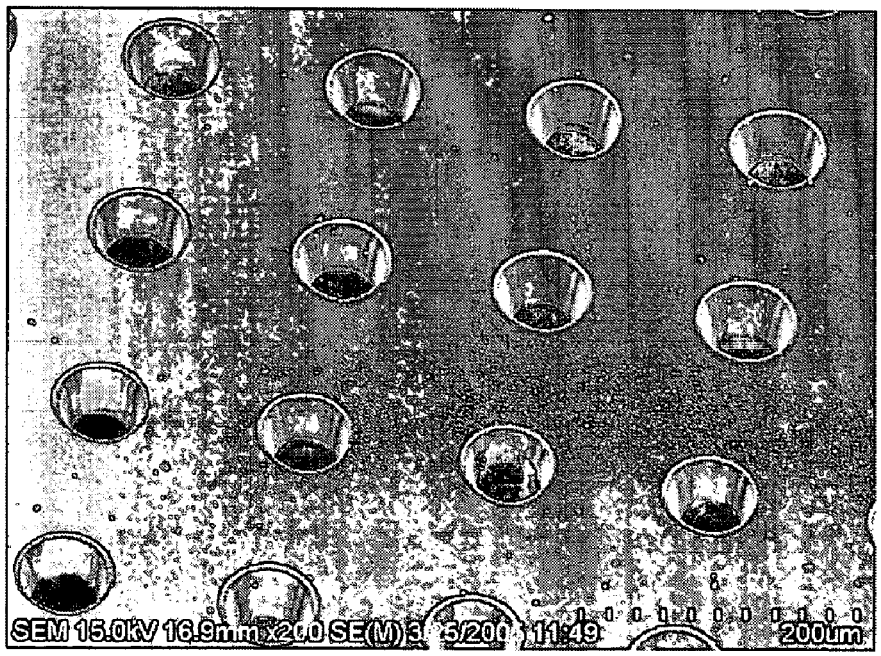

In the thermoplastic polymer film, through holes for fuel flow paths are formed (refer to FIG. 6). The through holes may be formed by applying a PCB process including laser drilling, lithography or etching. In the case of using polyimide as the film, the through holes may be formed by wet etching, and in the case of using photosensitive polyimide as the film, only a simple lithography process is required to realize a fuel cell structure.

Unlike the prior art, the through holes are directly formed in the polymer film according to the present invention, not requiring steps of coating polymer material on a glass substrate, conducting exposure to light and baking, and removing the polymer material from the glass substrate. This allows a simple manufacturing process and reduced manufacturing costs compared to a conventional process using MEMS technology or a conventional process of manufacturing a silicon fuel cell. Therefore, the fuel cell structure according to the present invention can preserve its flexible characteristics which may be degraded by the increased mechanical strength of the structure after undergoing the exposure to light and baking.

A thin metal layer functioning as a collector of electrons may be coated on an inner surface of each of the films provided for each of the anode and the cathode. The thin metal layer may be formed with, but not limited to, noble metals including Au, Pt and Cu due to their resistance values and chemical resistance characteristics necessary for the thin metal layer, via sputtering, etc.

Inside the through holes, a fuel diffusion layer and a catalyst layer can be formed to provide each of the anode and cathode. As a result, the catalyst is formed inside the through hole at a side of the thin metal layer, and the fuel diffusion layer is formed inside the through hole at a side without the thin metal layer. Material such as carbon paste is filled inside the through hole to form the fuel diffusion layer, and reactive catalyst is filled inside the through hole via spraying, etc. to form the catalyst layer reactive to the fuel.

The catalyst used in the present invention is not limited to a particular type and can be any general type, but preferably, Pt or Pt—Ru alloy can be used, and more preferably, Pt—Ru alloy for the catalyst at the anode side and Pt for the catalyst at the cathode.

The anode and the cathode as described above are placed with their respective metal layers opposed to each other, and the cation conducting polymer membrane such as such as a proton exchange membrane is disposed between the anode and the cathode. Then, the anode, the cation conducting polymer membrane and the cathode are hot-pressed together to manufacture the micro fuel cell.

In the present invention, the shapes of the through holes may be formed in various shapes in the thermoplastic polymer film to adjust fuel consumption rate and fuel supply rate in response to the reaction rate of the fuel. The shapes of the through holes may vary, for example, as follows.

Figure 1:
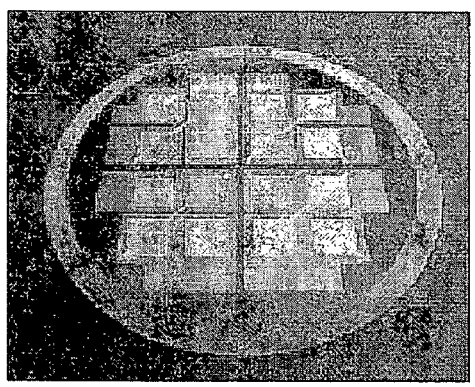
FIG. 1 is a plan view and a sectional view illustrating a conventional fuel cell with unit cells connected in series and inserted between disc-shaped Si substrates.
Figure 1:
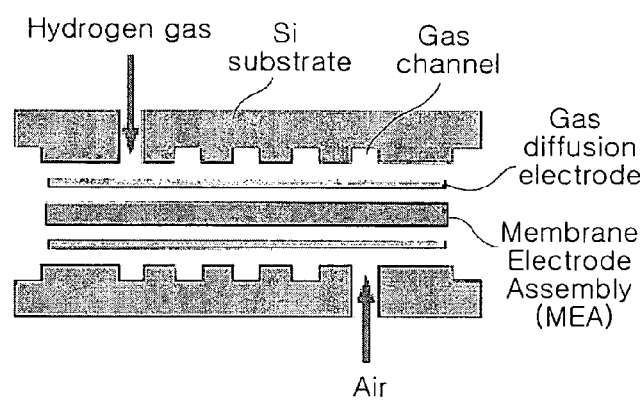
Figure 2:
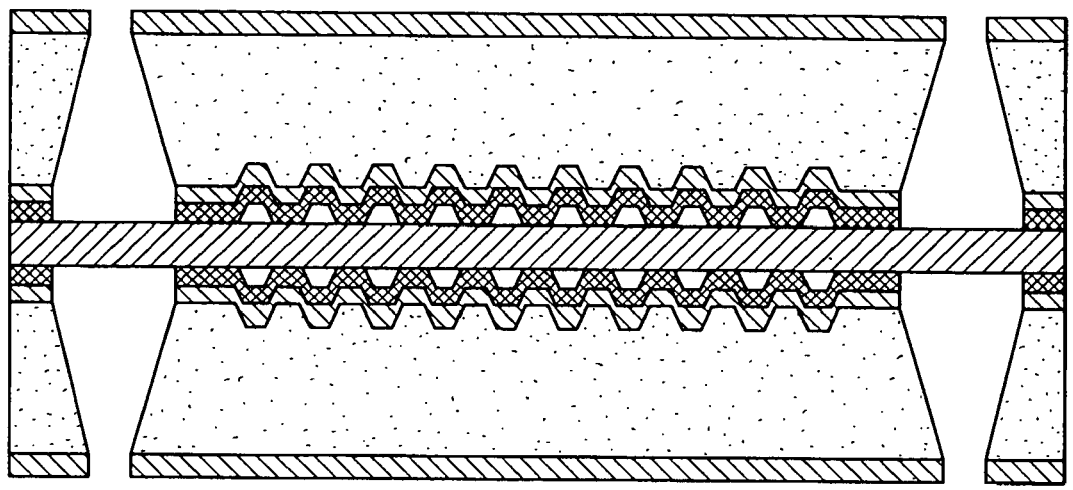
FIG. 2 is a schematic sectional view illustrating a silicon-based micro fuel cell.
Figure 2:
Figure 2:
Figure 2:
Figure 2:
Figure 3:
FIG. 3 is a schematic view illustrating a manufacturing process of a conventional micro Direct Methanol Fuel Cell (DMFC)
Figure 3:
Figure 3:
Figure 3:
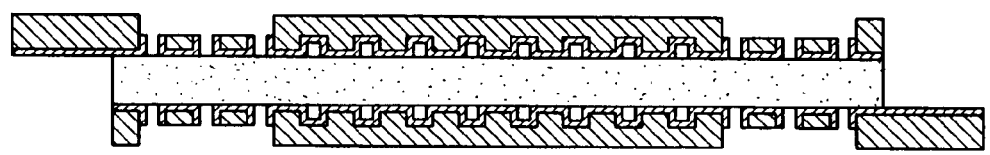
Figure 3:
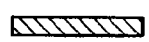
Figure 3:
Figure 3:
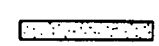
Figure 4:
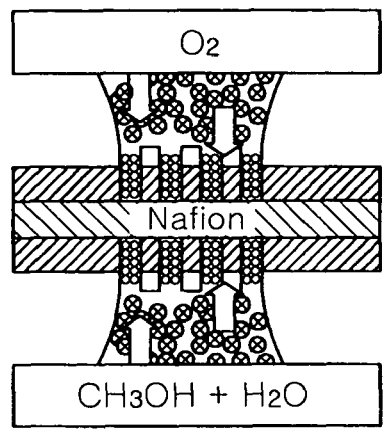
FIG. 4(a) is a schematic sectional view illustrating a conventional polymer micro DMFC using photosensitive material.
FIG. 4(b) is a schematic view illustrating a manufacturing process of the polymer micro DMFC.
Figure 4:
Figure 4:
Figure 4:
Figure 4:
Figure 4:
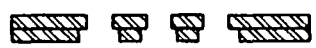
Figure 5:
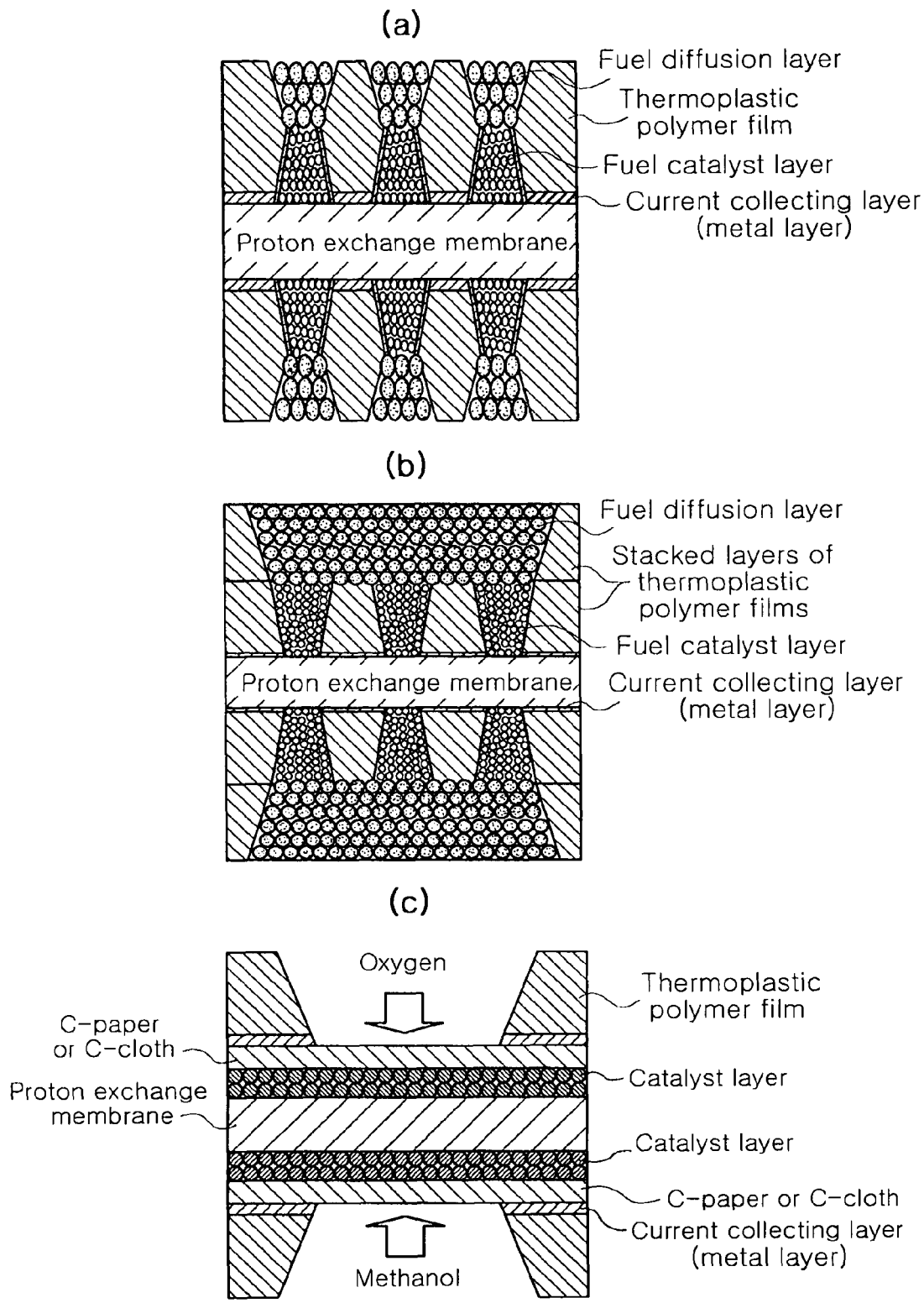
FIG. 5 is a sectional view illustrating a flexible fuel cell according to an embodiment of the present invention.
Figure 7:
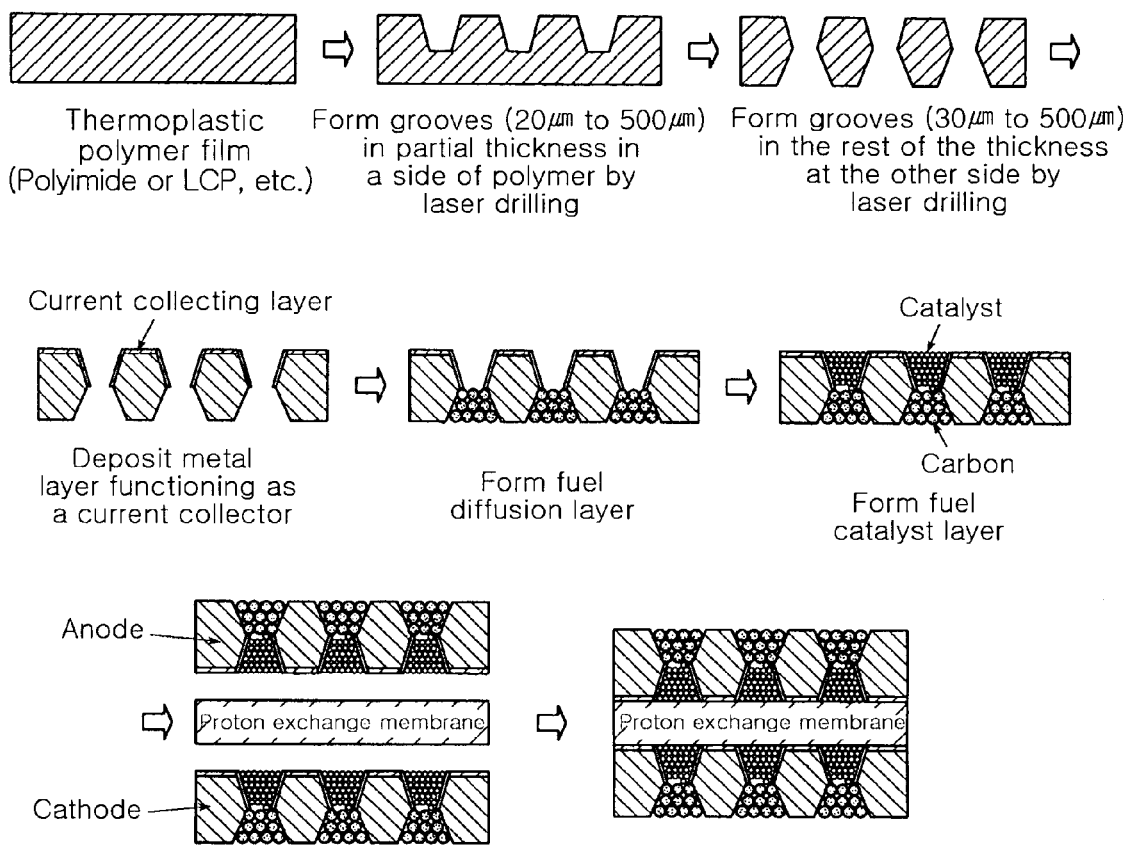
FIGS. 7 to 9 are views illustrating processes for manufacturing the micro fuel cells with variations to the through holes thereof according to Examples of the present invention.

Examples of the through holes formed in the film according to the present invention are shown in FIGS. 5(a) and 7. As shown, in order to form through holes for fuel flow paths, grooves for the fuel flow paths are formed in a depth that is ½ of a thickness of the film, and then the other side of the film is grooved in the rest of the thickness of the film, in areas corresponding to the grooves first formed, thereby completing through holes. The through holes may be configured such that the diameter D1 at the outer side of the film is different from the diameter D3 at the middle of the thickness direction of the film. Specifically, the through hole may be configured to have a diameter decreasing from the outer side of the film toward the middle of the thickness direction of the film (D1>D3), thereby having a sloped inner surface.

The sloped inner surface of each of the through hole facilitates coating the metal layer on an inner wall of each of the through holes to allow more effective current collecting in the case where the thin metal layer is coated to function as a current collecting structure as described above.

Figure 8:
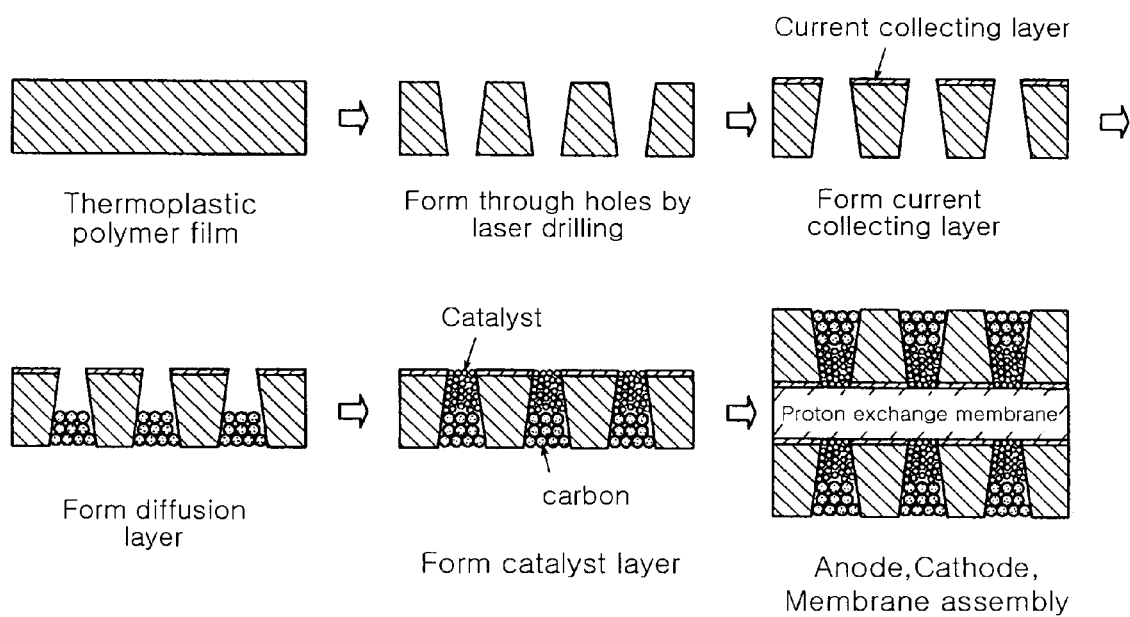

Alternatively, as shown in FIG. 8, the through holes in the polymer film may be configured such that a diameter D1 at an outer side surface of the film is greater than a diameter D2 at an inner side surface of the film so that the through hole has a sloped inner surface. Here, with respect to a center of the thickness of the film, the catalyst layer may be formed in the inner side of the film and the fuel diffusion layer may be formed in the outer side of the film.

Figure 9:
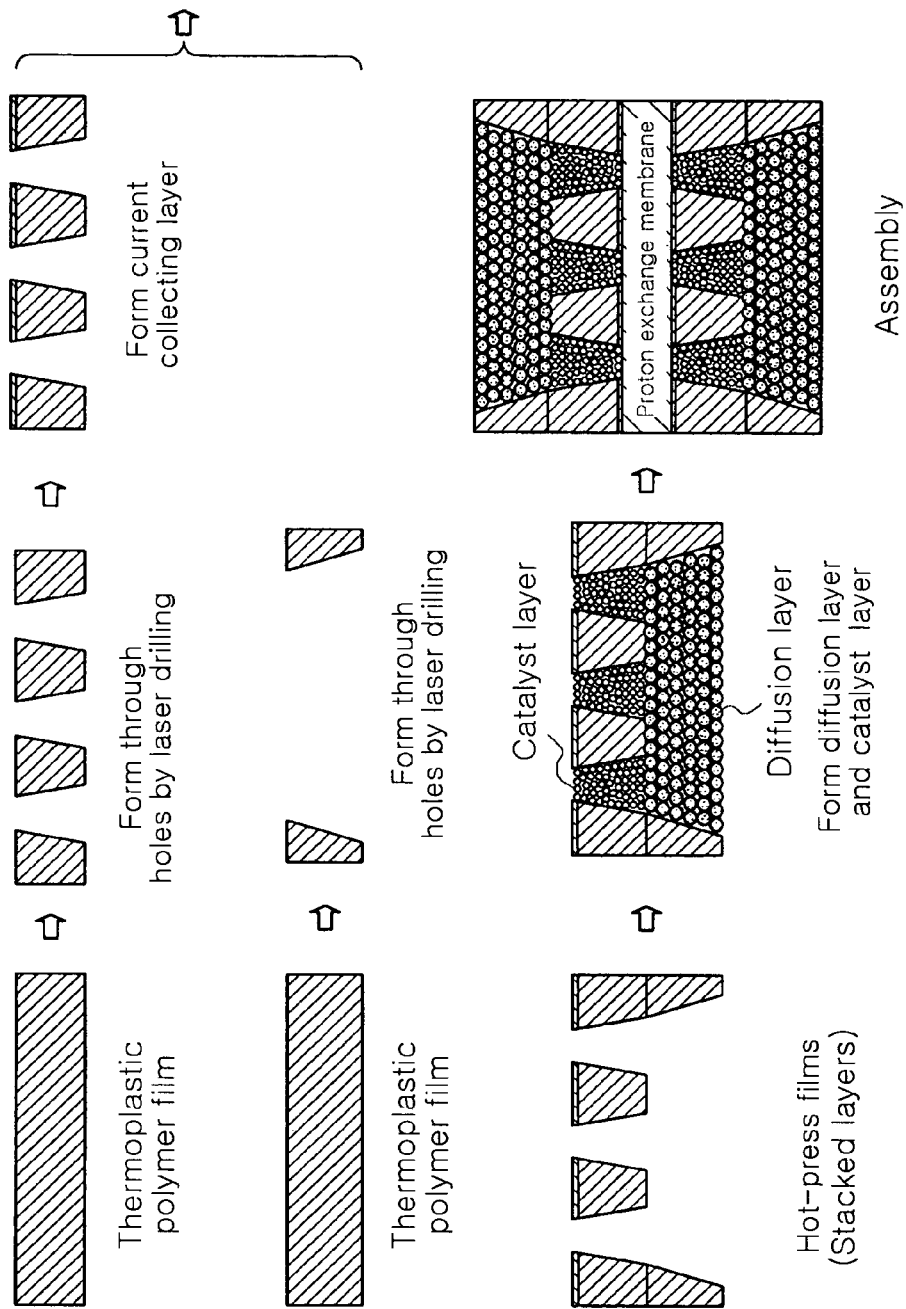

As a second embodiment of the invention, as shown in FIGS. 5(b) and 9, two layers of thermoplastic polymer films may be stacked to provide each of the anode and the cathode. In this case, one of the layers stacked is provided to form the fuel diffusion layer and the other one of the layers is provided to form the catalyst layer. Here, the through holes may be formed in each of the layers of films by applying a PCB process including laser drilling, lithography or etching. As shown in FIG. 9, a thin metal layer as a current collecting layer may be coated on the inner side face of the stacked layers.

The through holes formed in each of the layers of films have a diameter D1 at an outer side surface greater than a diameter D2 at an inner side surface, thus each having a sloped inner surface. Further, the average diameter of the through holes formed in each layer of films may be different from each other. In this case, it is preferable that the average diameter of the through holes formed in the film for the fuel diffusion layer is greater than that of the through holes formed in the film for the catalyst layer. Specifically, the through holes of the film for the fuel diffusion layer have an average diameter of 100 to 300 μm, and the through holes of the film for the catalyst layer have an average diameter of 30 to 100 μm.

The two layers each having the through holes formed therein and each provided for the fuel diffusion layer and the catalyst layer, are stacked and hot-pressed together to obtain stacked structures of films. In this case, it is preferable that the two layers are bonded such that the inner side surface of the film for the fuel diffusion layer faces the outer side surface of the film for the catalyst layer.

Preferably, the hot-pressing is conducted at a temperature ranging from 150 to 250° C. The temperature less than 150° C. results in weak bonding strength, whereas the temperature higher than 250° C. exceeds the glass transition temperature of the thermoplastic polymer film, which may result in destroying the structure.

Figure 10:
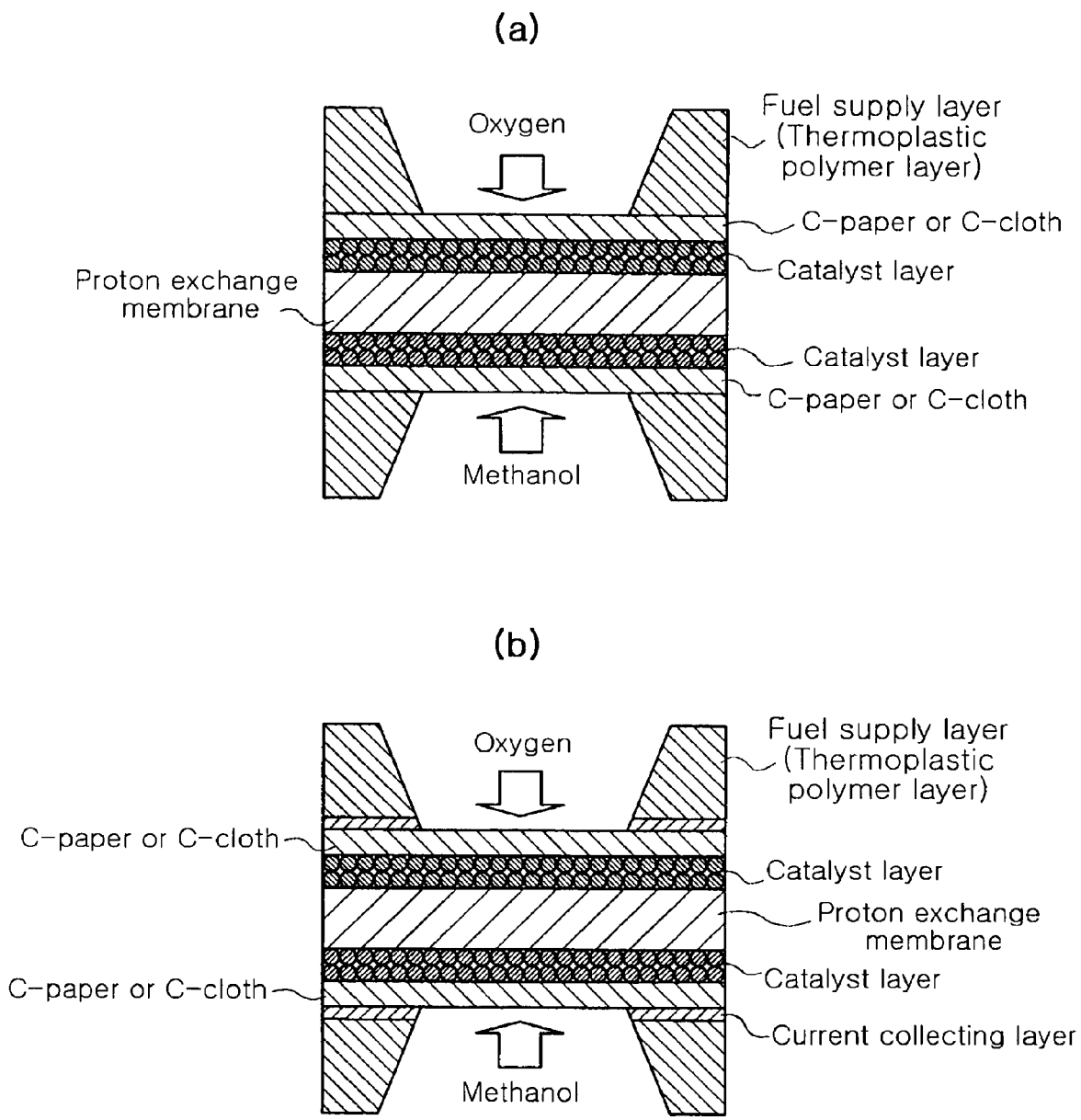
FIG. 10 is a schematic sectional view illustrating a micro fuel cell manufactured according to Example 4 of the present invention.

A method of manufacturing a flexible micro fuel cell according to a third embodiment of the present invention is as shown in FIGS. 5(c) and 10.

The method includes (i) providing a fuel supply layer by forming through holes in a thermoplastic polymer film by a process selected from laser drilling, lithography and etching, forming a fuel diffusion layer of carbon paper or carbon cloth at a lower part of the fuel supply layer, and providing a catalyst layer at a lower part of the fuel diffusion layer to provide an anode; (ii) repeating the procedure of step (i) to provide a cathode; and (iii) placing the anode and the cathode to have the catalyst layers thereof opposed from each other, disposing a cation conducting polymer membrane between the anode and the cathode, and hot-pressing the anode, the cation conducting polymer membrane, and the cathode together.

In this embodiment, the through holes are provided in a thermoplastic polymer film. The thermoplastic polymer film is a material typically applied to a printed circuit board, and the examples include polyimide, LCP or a Teflon film.

The through holes formed in the thermoplastic polymer film function as fuel supply channels, and may be formed by a PCB process selected from a group consisting of laser drilling, lithography and etching.

The through holes formed in the polymer film has a diameter D1 at an outer side surface of the film greater than a diameter D2 at an inner side surface, and has an inner surface sloped with respect to the surface of the film.

The inner surface of the polymer film is formed in contact with the fuel diffusion layer, and the catalyst layer is formed in contact with the fuel diffusion layer, collectively forming a Membrane Electrode Assembly (MEA), which constitutes each of the anode and cathode.

The MEA is a collective structure made of electrodes and polymer electrolyte. A catalyst, a dipersing agent, a binder and an electrolyte solution are mixed to obtain slurry, which is coated on a catalyst supporter to form the electrode. The anode and the cathode fabricated as above are disposed opposed to each other with the cation conducting polymer membrane (polymer electrolyte membrane such as a proton exchange membrane) disposed therebetween. The anode, the cation conducting polymer membrane and the cathode are hot-pressed together at a high temperature.

Here, the fuel diffusion layer is made of carbon paper or carbon cloth. The catalyst for the catalyst layer may be any general type used for a noble metal catalyst. Preferably, however, Pt or Pt/Ru alloy maybe adopted for the catalyst layer, and more preferably, Pt for the catalyst at the cathode side and Pt/Ru alloy for the catalyst at the anode side.

The carbon paper or the carbon cloth may sufficiently perform the current-collecting function without a current collecting metal layer (refer to FIG. 10(a)), but a thin metal layer may be formed at a side of the film bonded to the carbon layer to increase the efficiency (refer to FIG. 10(b)). The metal may be at least one selected from a group consisting of Au, Pt and Cu.

EXAMPLES

The present invention will now be explained through Examples. The present invention is not limited to the following Examples.

Example 1

Grooves were formed in a film type polyimide by laser drilling in a depth which is ½ of a total thickness of the film (refer to FIG. 7). Grooves were formed in the other side of the film in the rest of the thickness, connecting to the grooves first formed, completing through holes each having a sloped inner surface.

A metal layer, which can function as a current collecting structure, was formed with Pt on a surface of the film by sputtering. With each of the through holes having a sloped inner surface, the thin metal layer was also formed in the inner surface of each of the through holes. Then, a diffusion layer and a catalyst layer were formed so that the film can function as an anode and a cathode, respectively. Carbon paste was filled in the through hole at a side of the film to form the fuel diffusion layer and the catalyst was filled in the through hole at the other side of the film to form the catalyst layer. Here, Pt/Ru was used for the catalyst at the anode side, and Pt was used for the catalyst at the cathode side.

Nafion® available from Dupont, USA, was inserted between the pair of electrodes for the polymer electrolyte membrane. A resultant structure was hot-pressed at 110° C., at the pressure of 30 psi for 5 minutes, and then cooled at 30° C., to obtain the micro fuel cell.

The micro fuel cell obtained exhibited flexible characteristics.

Example 2

A micro fuel cell was manufactured by the same method as in Example 1, except that the through holes each having a sloped inner surface were formed via laser drilling only once (refer to FIG. 8).

The micro fuel cell obtained exhibited flexible characteristics.

Example 3

Through holes of different sizes were formed in each of 2 layers of films (refer to FIG. 9). Through holes with an average diameter of 150 μm were formed in the film provided for a fuel diffusion layer, and through holes with an average diameter of 50 μm were formed in the film provided for a catalyst layer. The through holes were formed by the same method as in Example 2. A metal layer was formed with Pt on a surface of the film provided as the catalyst layer to function as a current collecting structure.

The two layers of films obtained were hot-pressed together at 200° C. to obtain each of a single anode and cathode. Using the pair of anode and the cathode obtained as above, a micro fuel cell was manufactured by the same method as in Example 1.

The micro fuel cell obtained exhibited flexible characteristics.

Example 4

Through holes were formed in a film by the same method as in Example 2 to provide a fuel supply layer (refer to FIG. 10).

Each of the through holes were formed to have a sloped inner surface and an average diameter of 150 μm. A metal layer was formed on a surface of the film in contact with a fuel diffusion layer (refer to FIG. 10(b)). In accordance with the general MEA method, the fuel diffusion layer was formed with carbon paper, the catalyst at the anode side was formed with Pt/Ru alloy, and the catalyst at the cathode side was formed with Pt.

Nafion® available from Dupont, USA, was inserted as the polymer electrolyte membrane between the pair of electrodes. A resultant structure was hot-pressed at 110° C., at a pressure of 30 psi for 5 minutes and cooled at 30° C. to manufacture a micro fuel cell.

The micro fuel cell obtained exhibited flexible characteristics.

The method according to the present invention allows manufacturing a thin and flexible fuel cell applicable to wearable mobile phones, wearable computers and Bio-MEMS. In addition, the method allows a simple and easy manufacturing process, low manufacturing costs using a PCB process with reduced unit costs of products, and enables mass-production.

Moreover, the method allows an automated and simple manufacturing process to obtain a fuel cell product, reduces the path of fuel diffusion and does not incur initial investment costs since the existing equipment can be utilized.

Further, the method decreases the contact resistance between the electrolyte membrane and the electrodes, and allows arbitrary modification of the structures of the catalyst and electrolyte membrane.

While the present invention has been shown and described in connection with the preferred embodiments, it will be apparent to those skilled in the art that modifications and variations can be made without departing from the spirit and scope of the invention as defined by the appended claims.

What is claimed is:

1. A method of manufacturing a micro fuel cell comprising:
    forming through holes for flow paths of the fuel cell in a thermoplastic polymer film by a process selected from a group consisting of laser drilling, etching and lithography, coating a metal layer on an inner side surface of the thermoplastic polymer film, and filling the through holes with a fuel diffusion material and a catalyst to provide an anode;
    repeating the forming to provide a cathode; and
    placing the anode and the cathode to oppose each other, disposing a cation conducting polymer membrane between the anode and the cathode, and hot-pressing the anode, the cation conducting polymer membrane and the cathode,
    wherein the forming the through holes comprises:
    forming grooves in a side of the film in a depth that is ½ of a thickness of the film, and grooving in the other side of the film, in areas corresponding to the grooves formed first, thereby completing the through holes,
    wherein each of the through holes has a first diameter at an outer side and a second diameter at the middle of a thickness direction of the film, the first diameter greater than the second diameter to have an inner surface sloped with respect to the surface of the film.

2. The method of manufacturing a micro fuel cell according to claim 1, wherein the metal layer is further formed on a portion of the inner wall of the through hole adjacent to the inner side of the film.

3. The method of manufacturing a micro fuel cell according to claim 1, wherein each of the through holes has a first diameter at the outer side of the film and a second diameter at the inner side of the film, the first diameter greater than the second diameter to have a sloped inner surface.

4. The method of manufacturing a micro fuel cell according to claim 1, wherein the thermoplastic polymer film is made of one selected from a group consisting of polyimide, LCP and polytetrafluroethylene (PTFE) film.

5. The method of manufacturing a micro fuel cell according to claim 1, wherein the catalyst comprises Pt or Pt/Ru alloy.

6. The method of manufacturing a micro fuel cell according to claim 1, wherein the fuel diffusion material comprises carbon paste.

7. The method of manufacturing a micro fuel cell according to claim 1, wherein the metal layer is made of one selected from a group consisting of Au, Pt and Cu.

* * * * *